(12) United States Patent
Anna et al.

(10) Patent No.: US 8,392,909 B2
(45) Date of Patent: Mar. 5, 2013

(54) SYNCHRONIZING VITAL PRODUCT DATA FOR COMPUTER PROCESSOR SUBSYSTEMS

(75) Inventors: Gary Anna, Tucson, AZ (US); Ralph Thomas Beeston, Tucson, AZ (US); Joseph Whitney Dain, Vail, AZ (US); Henry Zheng Liu, Tucson, AZ (US); Jeffrey Wayne Pilch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1584 days.

(21) Appl. No.: 11/534,551

(22) Filed: Sep. 22, 2006

(65) Prior Publication Data
US 2008/0126522 A1    May 29, 2008

(51) Int. Cl.
G06F 9/44    (2006.01)
G06F 7/00    (2006.01)
G06F 15/177    (2006.01)

(52) U.S. Cl. .................. 717/173; 707/610; 709/221
(58) Field of Classification Search .......................... None
See application file for complete search history.

(56) References Cited

U.S. PATENT DOCUMENTS

| 6,014,669 | A  | * | 1/2000  | Slaughter et al. ............. 707/610 |
| 6,098,078 | A  |   | 8/2000  | Gehani et al. ................. 707/203 |
| 6,202,207 | B1 | * | 3/2001  | Donohue ....................... 717/173 |
| 6,219,675 | B1 |   | 4/2001  | Pal et al. ........................ 707/201 |
| 6,295,541 | B1 |   | 9/2001  | Bodnar et al. ................. 707/203 |
| 6,405,243 | B1 | * | 6/2002  | Nielsen ......................... 709/206 |
| 6,477,545 | B1 | * | 11/2002 | LaRue .......................... 707/625 |
| 6,516,327 | B1 |   | 2/2003  | Zondervan et al. ............ 707/200 |
| 6,539,381 | B1 |   | 3/2003  | Prasad et al. .................... 707/10 |
| 6,701,521 | B1 | * | 3/2004  | McLlroy et al. .............. 717/173 |
| 6,799,190 | B1 |   | 9/2004  | Boothby ......................... 707/204 |
| 6,820,088 | B1 |   | 11/2004 | Hind et al. ..................... 707/101 |
| 6,922,709 | B2 |   | 7/2005  | Goodman ..................... 707/203 |
| 7,089,550 | B2 | * | 8/2006  | Bakke et al. .................. 717/173 |
| 7,120,690 | B1 | * | 10/2006 | Krishnan et al. .............. 709/225 |
| 7,653,668 | B1 | * | 1/2010  | Shelat et al. .................. 707/610 |
| 7,870,226 | B2 |   | 1/2011  | Anna et al. |
| 8,015,270 | B2 | * | 9/2011  | Malkin et al. ................. 709/221 |
| 2001/0016853 | A1 |   | 8/2001 | Kucala |
| 2004/0153473 | A1 | * | 8/2004 | Hutchinson et al. ....... 707/104.1 |
| 2005/0015471 | A1 | * | 1/2005 | Zhang et al. .................. 709/221 |
| 2006/0288053 | A1 | * | 12/2006 | Holt et al. ..................... 707/203 |

OTHER PUBLICATIONS

Richard, B., "Clique: A Transparent, Peer-to-Peer Replicated File System", Lecture Notes in Computer Science [online], 2003 [retrieved Jul. 12, 2012], Retrieved from Internet: <http://www.springerlink.com/content/c32a7pk2judv0m60/fulltext.pdf>, pp. 351-355.*

(Continued)

Primary Examiner — Don Wong
Assistant Examiner — Todd Aguilera
(74) Attorney, Agent, or Firm — John H. Holcombe

(57) ABSTRACT

A computer processor subsystem, e.g. called a "target", in response to receiving an update to vital product data of the system from a source computer processor subsystem, examines the update to detect the vital product data of the target computer processor subsystem stored by the source computer processor subsystem; and, in response to the detected vital product data being incorrect, the target computer processor subsystem forwards its correct vital product data to the source computer processor subsystem having the incorrect vital product data. A computer processor subsystem is the authoritative reference for its vital product data.

8 Claims, 10 Drawing Sheets

OTHER PUBLICATIONS

Del Vecchio, D., et al., "Flexible Update Management in Peer-to-Peer Database Systems", Proceedings of the 10$^{th}$ Internation Database Engineeing and Application Symposium [online], 2005 [retrieved Jul. 12, 2012], Retrieved from Internet: <http://ieeexplore.ieee.org/stamp/stamp.jsp?tp=&arnumber=1540934>, pp. 1-10.*

* cited by examiner

SYNCHRONIZING VITAL PRODUCT DATA FOR COMPUTER PROCESSOR SUBSYSTEMS

FIELD OF THE INVENTION

This invention relates to systems of computer processor subsystems, and, more particularly to synchronizing the vital product data for the systems of computer processor subsystems.

BACKGROUND OF THE INVENTION

Computer systems, for example, which handle mission critical information, are typically made up of a plurality of computer processor subsystems, often remote from one another, to enable high availability access and continuous access 24/7/365. One example of mission critical information comprises customer data. The environment particular to this type of system entails multiple computer processors that work in conjunction to process data in a high availability environment. Such a system might comprise disk drive cache and data storage libraries, together with controllers and communication nodes, comprising computer processor subsystems called "clusters".

It is important that computer processor subsystems have consistent information about each other in order to provide the high availability environment. One example of computer processor subsystems are cache storage and tape libraries to store data for both immediate and long term use at the various locations for the high availability environment.

The information about each of the computer processor subsystems is termed vital product data, and may comprise IP (internet protocol) addresses, Ethernet adapter addresses, number and type of tape drives, tape drive serial numbers, controller code levels, tape drive code levels, fiber optic cable serial numbers, tape library identifier, etc. For example, if a controller of a cluster has the wrong tape library identifier, the cluster cannot become operational.

The computer processor systems therefore need to have consistent correct information about each other, and a term for the consistency is that the system vital product data is "synchronized".

SUMMARY OF THE INVENTION

Methods, systems, subsystems and computer program products are configured to synchronize vital product data. In one embodiment, from the viewpoint of one computer processor subsystem with respect to the system of computer processor subsystems comprises the one computer processor subsystem, e.g. called a "target", in response to receiving an update to vital product data of the system from a source computer processor subsystem, examines the received vital product data to detect vital product data of the target computer processor subsystem stored by the source computer processor subsystem; and, in response to the detected vital product data being incorrect, the one (target) computer processor subsystem forwards its correct vital product data to the computer processor subsystem having the incorrect vital product data.

In a further embodiment, a computer processor subsystem, in response to receiving vital product data of another computer processor subsystem of the system, if the sending computer processor subsystem is the authoritative reference for the received vital product data, updates the vital product data for the sending another computer processor subsystem as stored by the receiving computer processor subsystem with the received vital product data.

In another embodiment, if none of the computer processor subsystems of the system is an authoritative reference for the received vital product data, the receiving computer processor subsystem compares a timestamp of the received vital product data to a timestamp of that vital product data as stored by the receiving computer processor subsystem; and, if the received timestamp is more recent than the stored timestamp, updating the stored vital product data with the received vital product data; else, maintaining the stored vital product data.

In another embodiment, the one (target) computer processor subsystem comprises a data storage cluster comprising controller(s), cache, and automated data storage library(ies), wherein the controller(s) comprises a node of the system.

In a further embodiment, the one (target) computer processor subsystem additionally determines whether vital product data about a third computer processor subsystem stored by the other computer processor subsystem is different from the vital product data about the third computer processor subsystem stored by the one (target) computer processor subsystem; and if the vital product data is different, the one (target) computer processor subsystem requests the third computer processor subsystem to update the one (target) computer subsystem and the other computer subsystem with the correct vital product data of the third computer processor subsystem.

In a still further embodiment, if the difference in the vital product data is communication addressing information of the third computer processor subsystem, the one (target) computer processor subsystem sends the request to the third computer processor subsystem using the one computer processor subsystems's communication address for the third computer processor subsystem; and if the request fails, the one (target) computer processor subsystem sends the request to the third computer processor subsystem using the other computer processor subsystem's communication address for the third computer processor subsystem.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
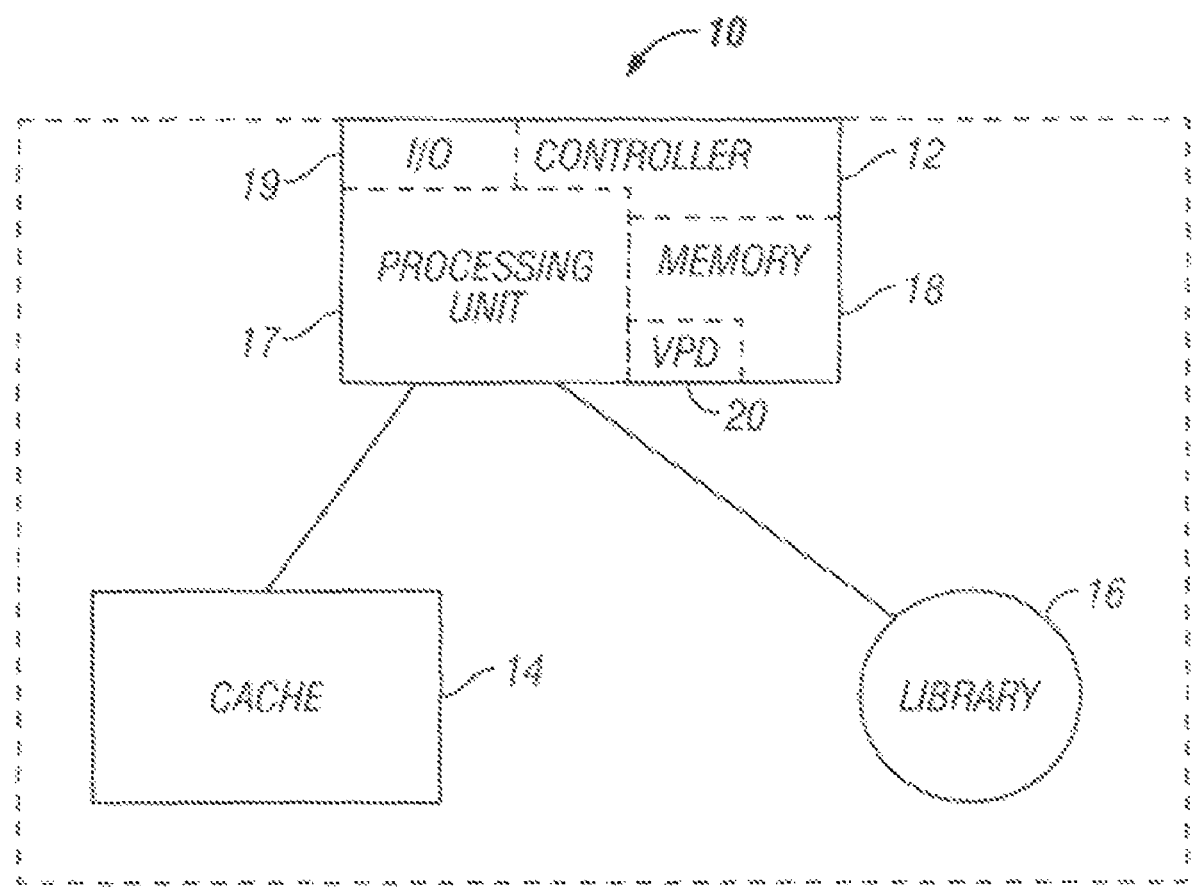
FIG. 1 is a block diagram of a computer processor subsystem which may implement the present invention.

Referring to FIG. 1, an example of a computer processor subsystem 10 is illustrated that may implement the present invention. Another term for a computer processor subsystem herein is "cluster", and the two terms may be employed interchangeably.

The exemplary computer processor subsystem 10 comprises structures for handling customer data, and comprises, inter alia, a controller 12, cache storage 14, and an automated data storage library 16. The controller 12 represents one or more processor units 17, associated memory 18 and one or more external input/output nodes 19 for the computer processor subsystem 10. An example of a controller 12 comprises the IBM® pSeries controller with associated Ethernet switches and routers, an example of cache storage 14 comprises an IBM® DS6000 RAID system (RAID=redundant array of independent disks), and an example of an automated data storage library 16 comprises an IBM® 3584 tape library, having IBM® 3592 tape drives. Other examples may be substituted, such as optical disk libraries, as are known to those of skill in the art.

Vital product data 20 for the cluster or computer processor system 10 is shown as stored in memory 18, and may be stored at any suitable storage of the controller, cache storage or library. Vital product data for the individual components may be stored with those components. An embodiment of the invention may comprise a hardware embodiment of the controller 12 or other suitable component, an entirely software embodiment, or an embodiment having both hardware and software elements, for example, operating the controller 12 and/or other suitable components of one or more computer processor subsystems 10. The invention may take the form of a computer program product accessible from a computer readable medium, such as memory 18, and comprising computer readable program code. The computer readable medium comprises any apparatus that can contain, store, communicate, propagate, or transport the program for use by or in connection with a computer, and may be called code or microcode or any other appropriate terminology. The computer readable medium can be an electronic, magnetic, optical electromagnetic, infrared, or semiconductor system or device or a propagation medium. Examples comprise semiconductor or solid state memory, magnetic tape, removable diskette(s), random access memory, read-only memory, rigid magnetic disk(s), and optical disk(s).

Figure 2:
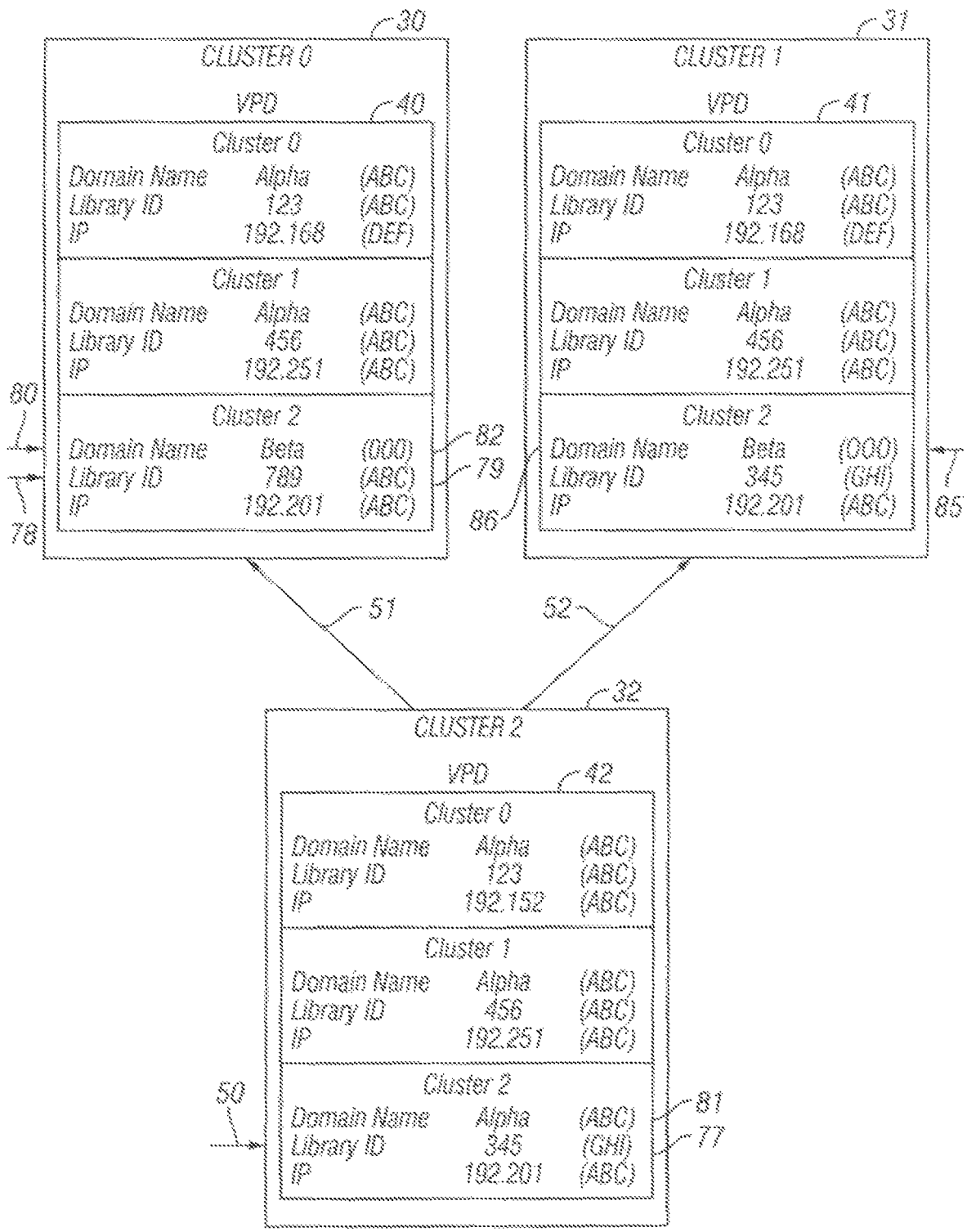
FIGS. 2, 3 and 4 are diagrammatic illustrations of embodiments of the present invention employing computer processor subsystems of FIG. 1.

Referring to FIGS. 1 and 2, it is important that vital product data 20 for each of the clusters 30, 31, 32, shown as vital product data 40, 41, 42, be synchronized between the clusters in order for the clusters to interact correctly in order to provide a high availability environment. That is, the computer processor subsystems need to have consistent correct information about each other. Vital product data may comprise IP (internet protocol) addresses, Ethernet adapter addresses, number and type of tape drives, tape drive serial numbers, controller code levels, tape drive code levels, fiber optic cable serial numbers, tape library identifier, etc. For example, if a controller of a cluster has the wrong tape library identifier, the cluster cannot become operational. As another example, if one cluster has the incorrect IP address of another cluster, it cannot communicate directly with that cluster.

The clusters 30, 31 and 32 may, for example, be located remotely from one another, such that cluster 30 may be in New York, cluster 31 may be in Los Angeles, and cluster 32 may be in Phoenix. A complete system may incorporate many additional cluster scattered throughout the United States or throughout the world in order to provide high availability for the system as a whole.

Figure 3:
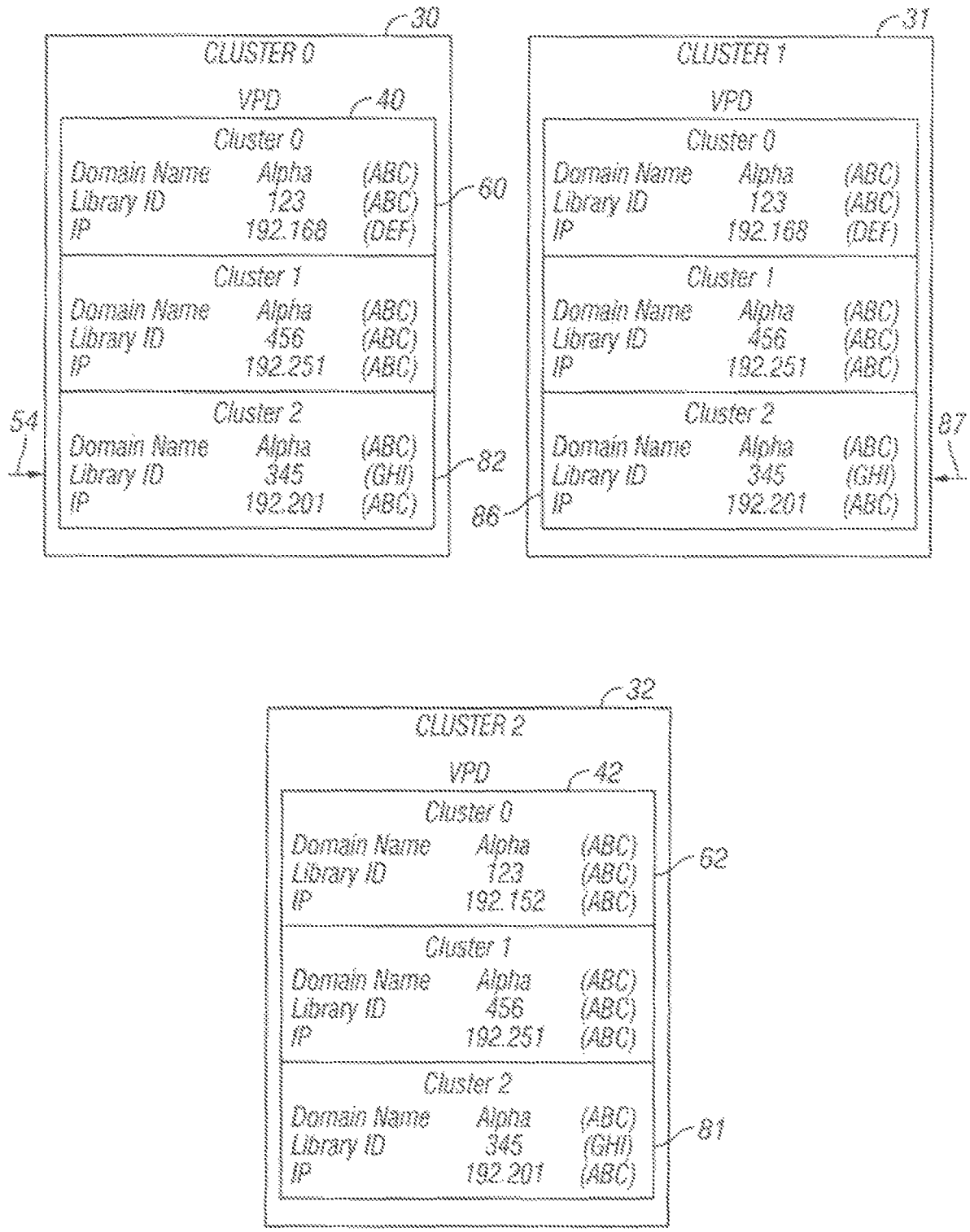
Figure 4:
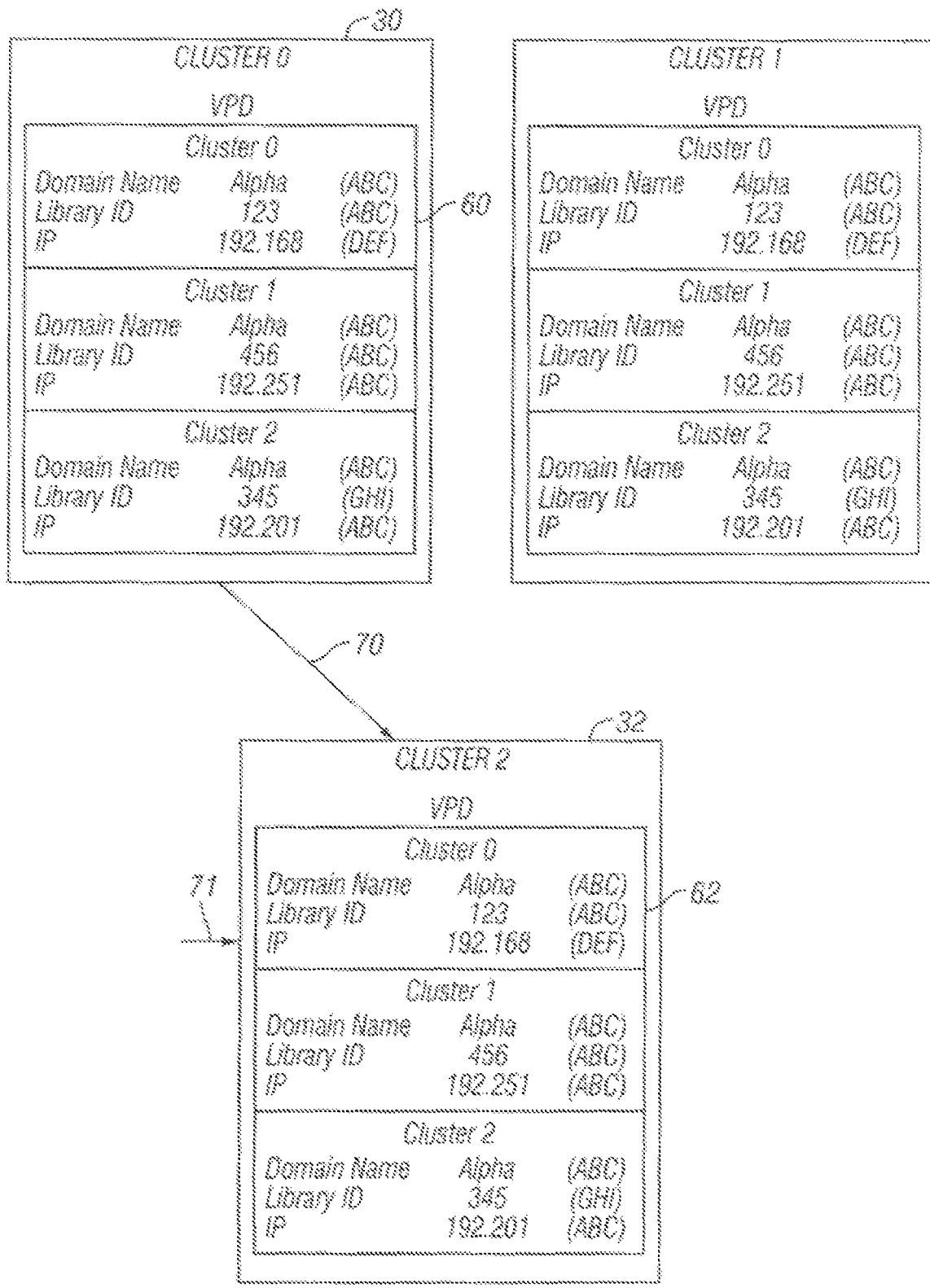

Referring to FIGS. 2, 3 and 4, in one embodiment of the invention, a computer processor subsystem 32 updates its "Library ID" in step 50. The Library ID may be updated because a new automated data storage library has been installed in the cluster, or because a new or different virtual library (comprising an assigned portion of the full library) has been assigned to the computer processor subsystem. The computer processor subsystem 32, in steps 51 and 52, broadcasts its entire view of the vital product data of the system, including the update of the Library ID, to the other computer processor subsystems 30 and 31, so that the other computer processor subsystems may synchronize to the new Library ID. The broadcasting computer processor subsystem may be termed a "source" for the new data. A computer processor subsystem 30, e.g. called a "target", in response to receiving the update to vital product data of a source computer processor subsystem 32 in step 51, including its view of the system, will update the vital product data of the source cluster in step 54 as will be discussed, and examines the received vital product data to detect the vital product data 62 of the target computer processor subsystem 30 as stored by the source computer processor subsystem 32. In the example, the detected vital product data is incorrect, as shown by the "IP" address of the target vital product data 60 being different than that shown in the vital product data 62.

A computer processor subsystem is considered, in accordance with the present invention, to be the authoritative reference for its own vital product data. Thus, in response to the detected vital product data being incorrect, the computer processor subsystem 30, in step 70, forwards its correct vital product data 60 to the other computer processor subsystem 32 having the incorrect vital product data.

In one embodiment, the computer processor subsystem 30 forwards a copy of its entire vital product data file, and in another embodiment, the computer processor subsystem forwards only a portion of the file 60 having the data needing the correction.

In step 71, computer processor subsystem 32 updates its copy of the vital product data 62 of the computer processor subsystem 30 with the correct data, and the vital product data for both computer processor subsystem 30 and computer processor subsystem 32 is synchronized.

Still referring to FIGS. 2, 3 and 4, in another embodiment of the present invention, a computer processor subsystem, for example, computer processor subsystem 30, in response to receiving, in step 51, in the update, vital product data of another computer processor subsystem 32 of the system, determines, in step 78, whether the sending computer processor subsystem 32 is the authoritative reference for the vital product data. The determination may be made based on an indicator accompanying the data from the sender. Alternatively, the determination may be made from a table or listing at the receiving computer processor subsystem 30 indicating what type(s) of vital product data have (and/or do not have) an authoritative reference. Alternatively, the determination may be made based on the structure of the data itself.

For example, a Domain Name does not have an authoritative reference of any of the clusters, but a Library Identification does have an authoritative reference, which is the vital product data of the cluster to which the library belongs.

Thus, computer processor subsystem 30, in step 78, in one embodiment, determines that computer processor subsystem 32 is the authoritative reference for the Library Identification 77, and updates the stored vital product data Library Identification 79 with the vital product data Library Identification 77 authoritative reference for that vital product data.

For example, a Domain Name may be established externally and none of the computer processor subsystems of the system is an authoritative reference, but a Library Identification does have an authoritative reference, which is the computer processor subsystem to which the library belongs.

If none of the computer processor subsystems is an authoritative reference for the received vital product data, timestamps of the vital product data are compared.

Thus, in step 80, computer processor subsystem 30 determines that none of the computer processor subsystems is an authoritative reference for the Domain Name, and compares, in step 80, a timestamp of the received vital product data 81 to a timestamp of that vital product data 82 as stored by the receiving computer processor subsystem 30. For the purpose of illustration, the timestamps progress alphabetically. In step 80, the received timestamp "ABC" is more recent than the stored timestamp "000". Thus, computer processor subsystem 30, in step 54, updates the stored vital product data 82 with the received vital product data 81. If the timestamps are the same, or the received timestamp is earlier than the stored timestamp, the computer processor subsystem 30 maintains the stored vital product data.

As will be discussed, alternatively, if the received and stored timestamps are the same, the receiving computer processor subsystem may still replace the stored vital product data. Herein, this is considered to be "maintaining" the vital product data.

Similarly, computer processor subsystem 31, in response to receiving, in the update step 52, vital product data of another computer processor subsystem 32 of the system, if none of the computer processor subsystems is an authoritative reference of the vital product data, compares, in step 85, a timestamp of the received vital product data 81 to a timestamp of the corresponding vital product data stored 86 as stored by the receiving computer processor subsystem 31. In step 85, the received timestamp "ABC" is more recent than the stored timestamp "000". Thus, computer processor subsystem 31, in step 87, updates the stored vital product data 86 with the received vital product data 81. If the timestamps are the same, or the received timestamp is earlier than the stored timestamp, the computer processor subsystem 31 maintains the stored vital product data.

In another example, computer processor subsystem 32, in response to receiving, in step 70, vital product data of another computer processor subsystem 30 of the system, determines whether the sending computer processor subsystem 30 is the authoritative reference of the received vital product data 60, and, if so, computer processor subsystem 32, in step 71, updates the stored vital product data 62 with the received vital product data 60.

Figure 5:
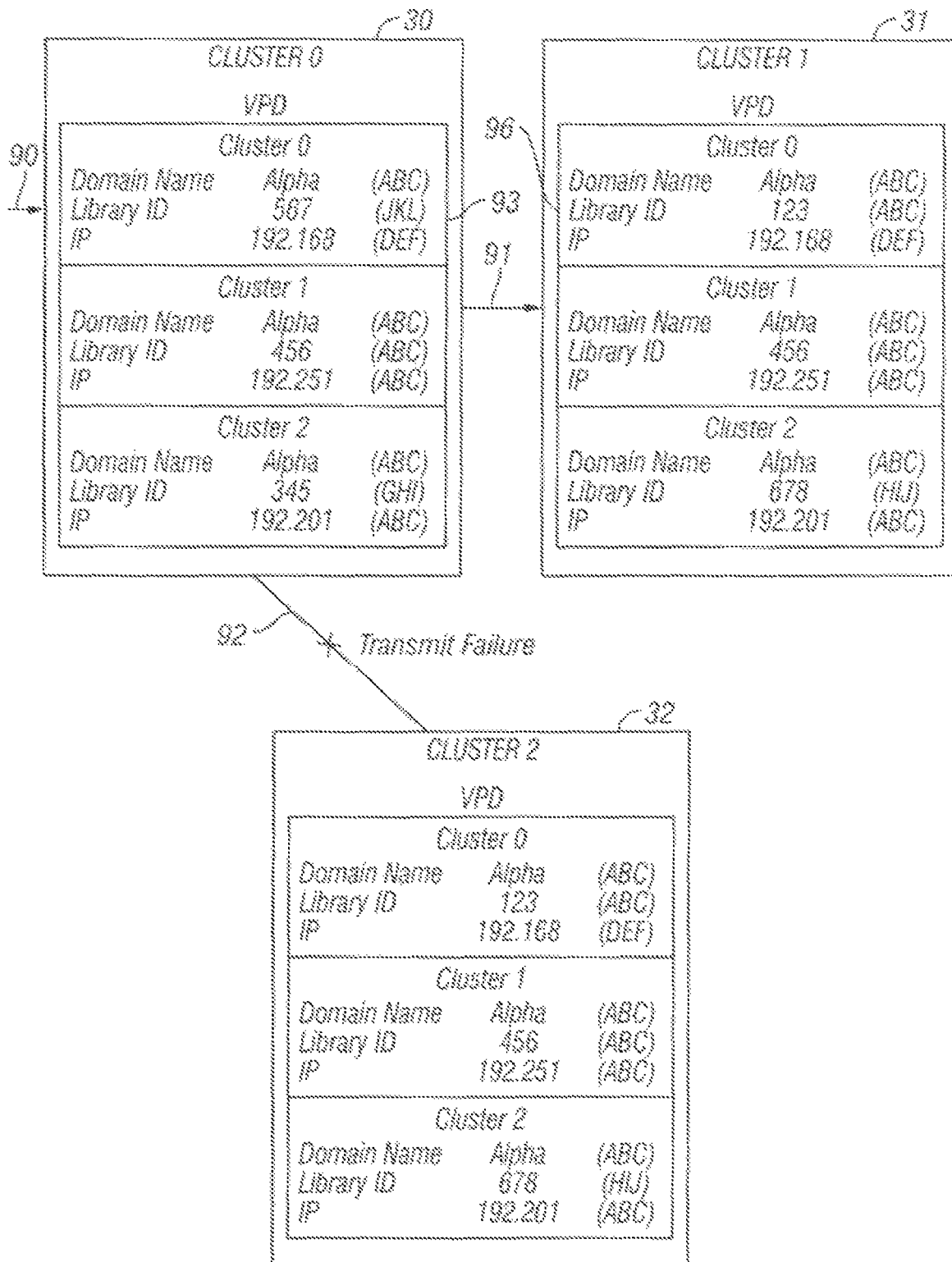
FIGS. 5, 6 and 7 are diagrammatic illustrations of a further embodiment of the present invention employing computer processor subsystems of FIG. 1.
Figure 6:
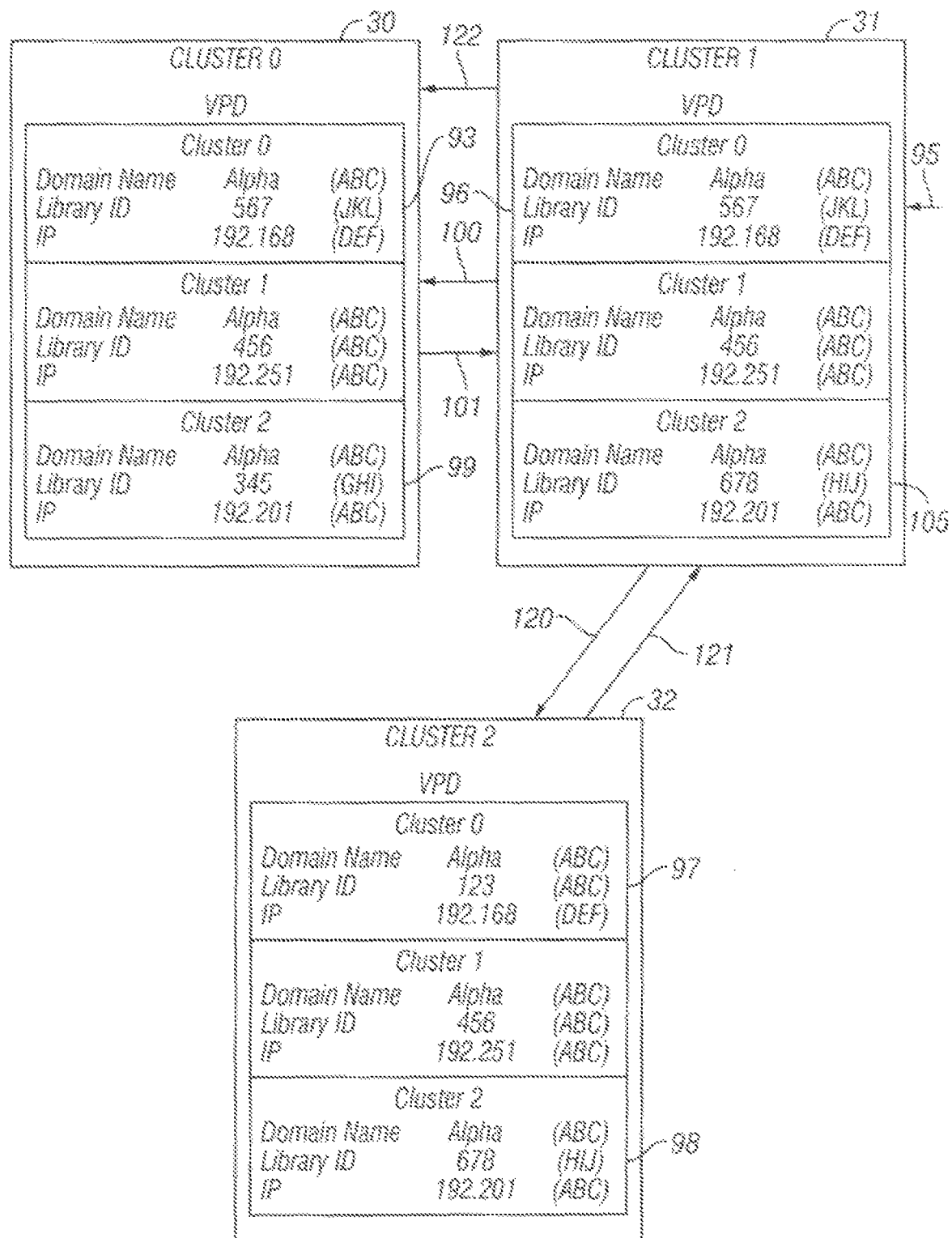
Figure 7:
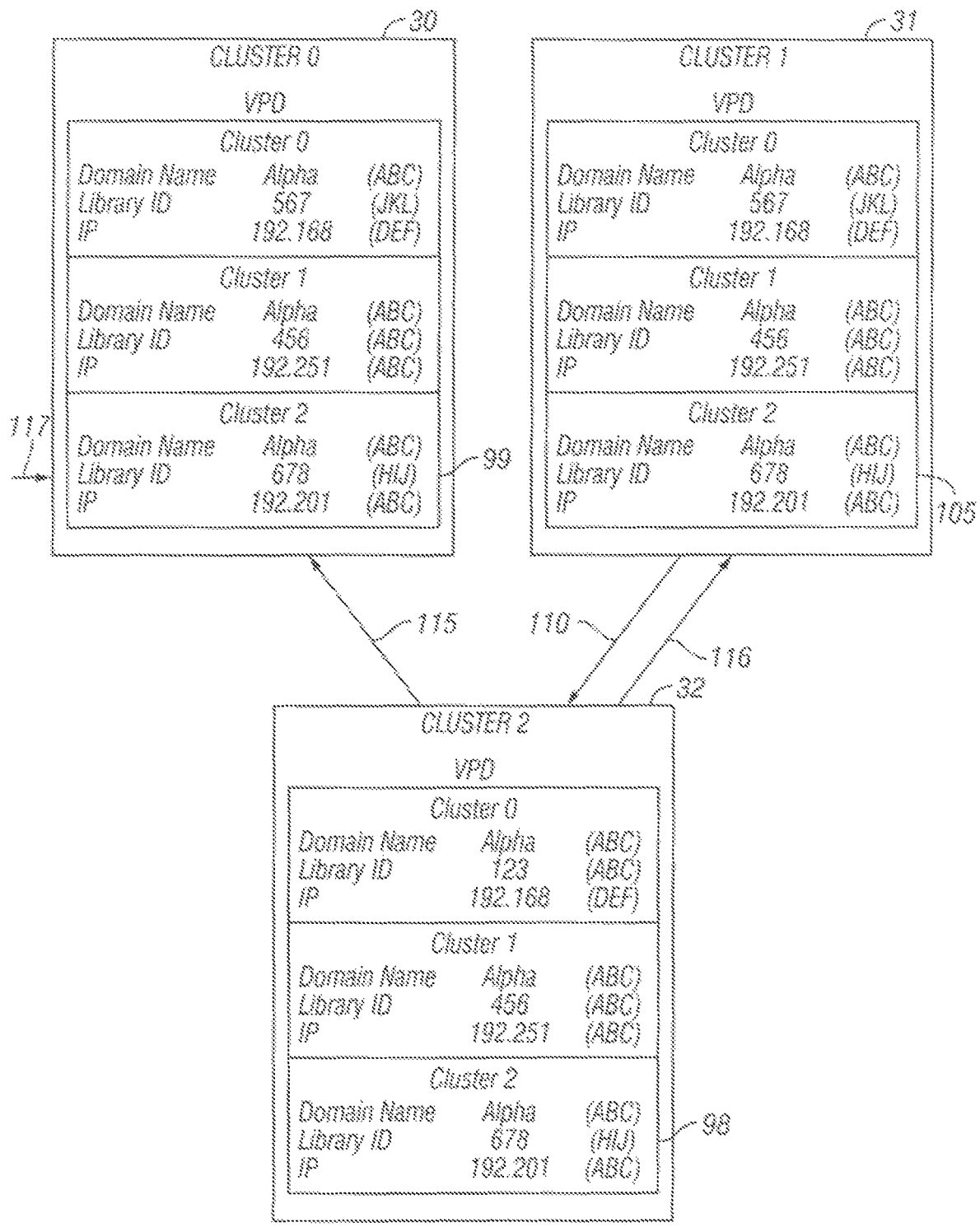

Referring to FIGS. 5, 6 and 7, in step 90, processor subsystem 30 updates its "Library ID". The computer processor subsystem 30, in steps 91 and 92, broadcasts the update of the Library ID vital product information 93 to the other computer processor subsystems 31 and 32, so that the other computer processor subsystems may synchronize to the new Library ID. Computer processor subsystem 31 receives the vital product data from the source 30, and, because computer processor subsystem 30 is the authoritative reference for its vital product data, in step 95, computer processor subsystem 31 updates its copy 96 of the vital product data 93 for the computer processor subsystem 30.

However, for the purpose of illustration, step 92 does not complete, for example, due to a transmit failure. Thus, vital product data 97 stored by computer processor subsystem 32 fails to be synchronized to the system. Similarly, for the purpose of illustration, vital product data 98 for computer processor subsystem 32 is not synchronized to the copy of vital product data 99 for computer processor subsystem 32 as stored by computer processor subsystem 30.

In accordance with a further embodiment of the invention, the one (target) computer processor subsystem, in the example computer processor subsystem 31, in steps 100 and 101, additionally determines whether vital product data 99 about a third computer processor subsystem 32 stored by the other computer processor subsystem 30 is different from the vital product data 105 about the third computer processor subsystem 32 stored by the one (target) computer processor subsystem 31. If the vital product data is of the type that does have an authoritative reference in the system, and neither of the communicating computer processor subsystems is the authoritative reference for the vital product data, a request for an update may be made to the computer processor subsystem that is the authoritative reference. If the vital product data is different and/or the timestamps are different, and a third computer processor subsystem is the authoritative reference, the one (target) computer processor subsystem 31 requests, in step 110, the third computer processor subsystem 32 to update the one (target) computer subsystem 31 and the other computer subsystem 30 with the correct vital product data 98 of the third computer processor subsystem 32. Even though the timestamps for the copies 99 and 105 were different, neither the computer processor subsystem 30 nor the computer processor subsystem 31 is the authoritative reference for the Library ID and are not used for an update.

In steps 115 and 116, the third computer processor subsystem 32 updates the one (target) computer subsystem 31 and the other computer subsystem 30 with the correct vital product data 98 of the third computer processor subsystem 32.

Computer processor subsystem 30 receives the vital product data from the computer processor subsystem 32, and, because computer processor subsystem 32 is the authoritative reference for its vital product data, in step 117, computer processor subsystem 30 updates its copy 99 of the vital product data 98 for the computer processor subsystem 31. Computer processor subsystem 31, in step 116, also receives the vital product data from the computer processor subsystem 32, and even though the timestamp "HIJ" for vital product data 98 is the same as the timestamp "HIJ" for the copy of vital product data 105, computer processor subsystem 31 updates its copy 105 of the vital product data 105 for the computer processor subsystem 32.

In a similar example, computer processor subsystem 31, in steps 120 and 121 of FIG. 6, additionally determines whether vital product data 97 about a third computer processor subsystem 30 stored by the other computer processor subsystem 32 is different from the vital product data 96 about the third computer processor subsystem 30 stored by the one (target) computer processor subsystem 31. Since step 92 had not completed, the vital product data is different, and the one (target) computer processor subsystem 31, in step 122, requests the third computer processor subsystem 30 to update the one (target) computer subsystem 31 and the other computer subsystem 32 with the correct vital product data 93 of the third computer processor subsystem 30.

Figure 8:
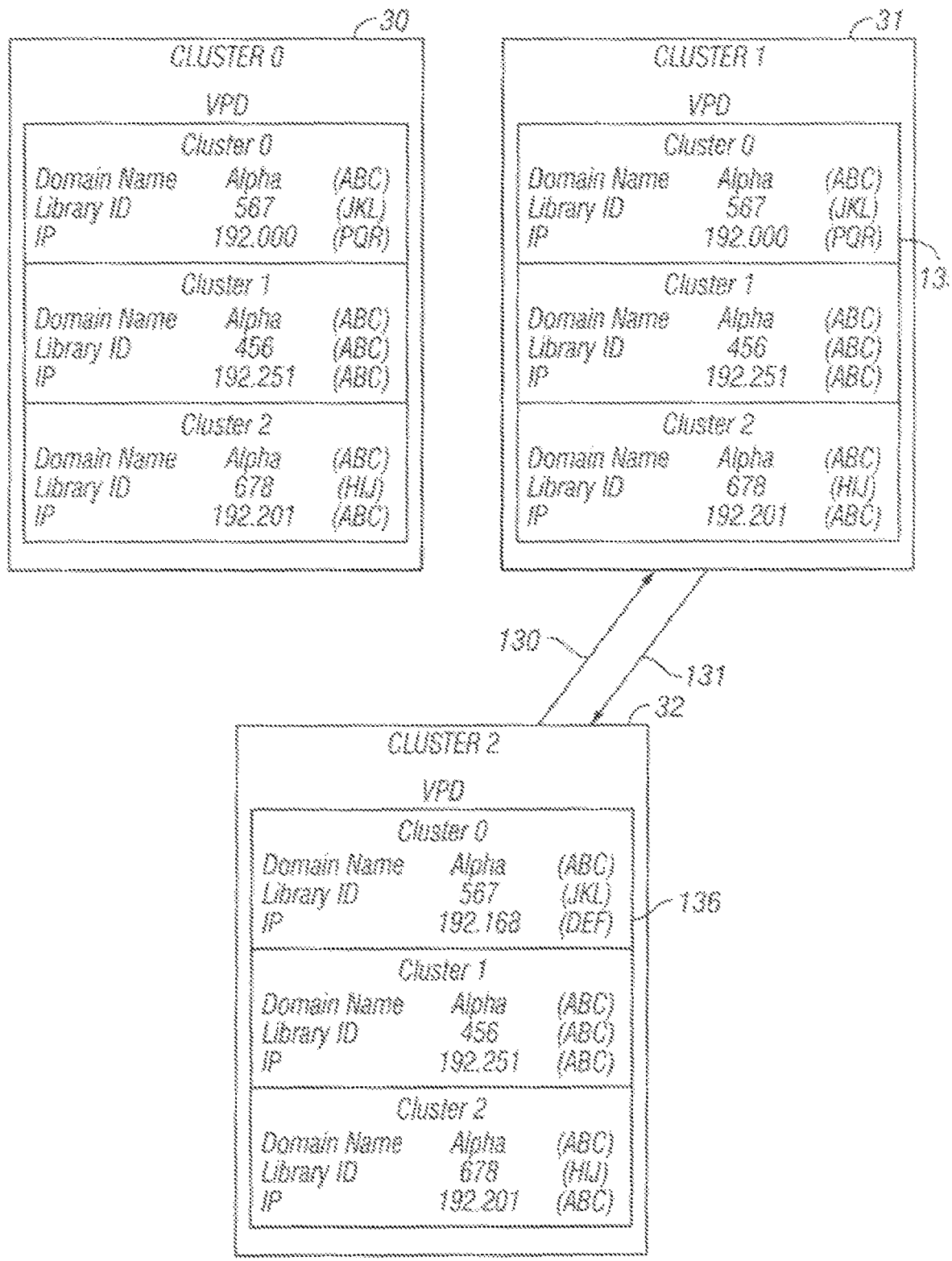
FIGS. 8, 9 and 10 are diagrammatic illustrations of a still further embodiment of the present invention employing computer processor subsystems of FIG. 1.
Figure 9:
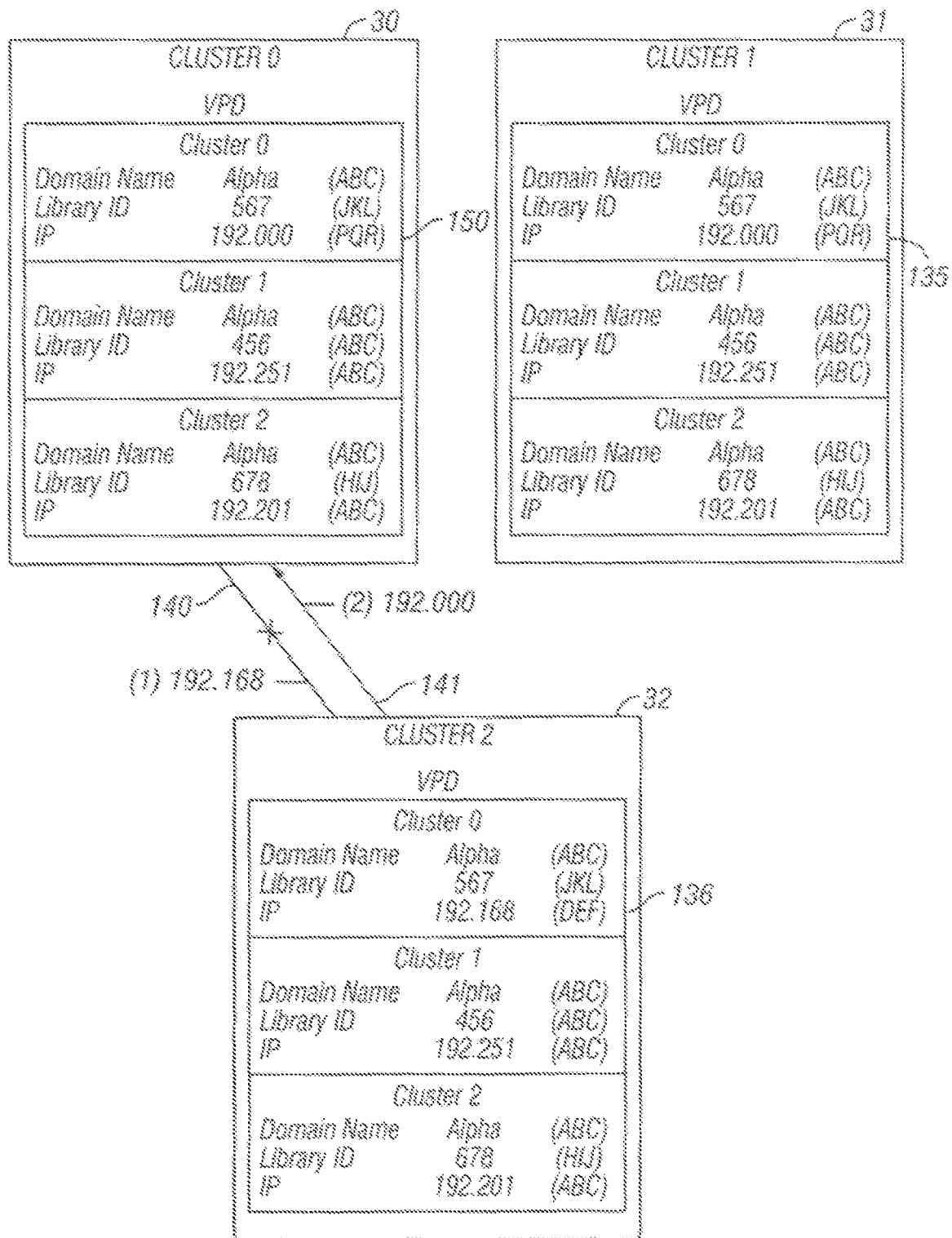
Figure 10:
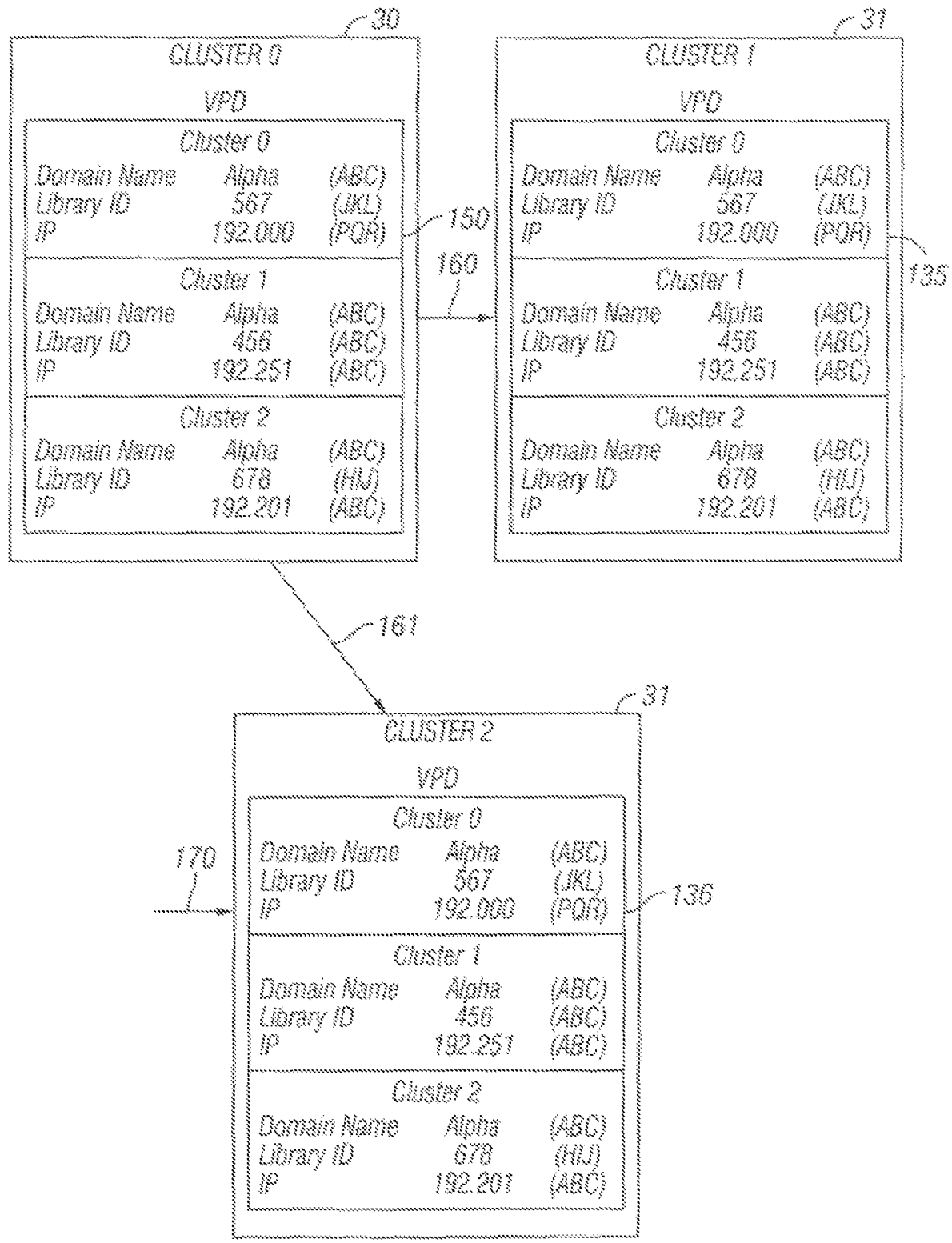

Referring to FIGS. 8, 9 and 10, the vital product data of cluster 31 is checked by cluster 32 in steps 130 and 131, and the difference in the vital product data 135 about a third computer processor subsystem 30 stored by the other computer processor subsystem 31 and the vital product data 136 about the third computer processor subsystem 30 stored by the one (target) computer processor subsystem 32 is the IP address of the third computer processor subsystem 30. Both the vital product data and the timestamps are different, and neither the computer processor subsystem 31 nor the computer processor subsystem 32 is the authoritative reference for the vital product data of the third computer processor subsystem, here its IP address. In accordance with a further embodiment of the invention, where the difference in the vital product data is communication addressing information of the third computer processor subsystem, the one (target) computer processor subsystem 32 sends the request, in step 140, to the third computer processor subsystem 30 using the one computer processor subsystem's communication address for the third computer processor subsystem, which is IP address "192.168";and if the request fails, the one (target) computer processor subsystem sends the request, in step 141, to the third computer processor subsystem using the other computer processor subsystem's communication IP address 135 "192.000" for the third computer processor subsystem 30.

The third computer processor subsystem 30, in response to the request for a broadcast, whichever request 140 or 141 is successful, will broadcast the correct vital product data 150 to the other computer processor subsystems of the system, as discussed above, in steps 160 and 161.

The illustrated examples of communication addressing information comprise IP (internet protocol) addresses, and may comprise any suitable addressing information for the purpose of communication, for example, IP addresses, Ethernet addresses, etc., as are known to those of skill in the art.

Also as discussed above, computer processor subsystem 31 receives the vital product data from the computer processor subsystem 30, and, because computer processor subsystem 30 is the authoritative reference for its vital product data, in step 170, computer processor subsystem 31 updates its copy 136 of the vital product data 150 for the computer processor subsystem 30. Computer processor subsystem 31, in step 160, also receives the vital product data from the computer processor subsystem 30, and even through the timestamp "PQR" for vital product data 135 is the same as the timestamp "PQR" for the copy of vital product data 150, computer processor subsystem 31 updates its copy 135 of the vital product data 150 for the computer processor subsystem 30.

In this embodiment, herein, any update received from the cluster that is providing a copy of its vital product data, the fact that the computer processor subsystem is the authoritative reference for its vital product data will require that the receiving computer processor subsystem updates the copy with the received copy of the vital product data.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for synchronizing vital product data in one computer processor subsystem with respect to a system of computer processor subsystems, said computer processor subsystems storing at least some vital product data of the other computer processor subsystems of said system, comprising the steps of:

said one computer processor subsystem, in response to receiving an update to vital product data of said system from a source computer processor subsystem of said system, examines said update to detect vital product data about said one computer processor subsystem stored by said source computer processor subsystem;

said one computer processor subsystem is the authoritative reference for its own vital product data and, in response to said detected vital product data having incorrect vital product data about said one computer processor subsystem, said one computer processor subsystem forwarding pre-existing correct vital product data of said one computer processor subsystem to said source computer processor subs stem having said incorrect vital product data;

wherein said one computer processor subsystem, in response to receiving vital product data of another computer processor subsystem of said system, if the sending computer processor subsystem is the authoritative reference for said received vital product data, updating the vital product data for said another computer processor subs stem as stored b said one computer processor subsystem with said received vital product data;

wherein said one computer processor subsystem additionally determines whether vital product data about a third computer processor subsystem stored by at least one other computer processor subsystem is different from said vital product data about said third computer processor subsystem stored by said one computer processor subsystem; and said third computer processor subsystem is the authoritative reference for its own vital product data, and if said vital product data about said third computer processor subsystem stored by said at least one other computer processor subsystem is different, said one computer processor subsystem requests said third computer processor subsystem to update said one computer subsystem and said at least one other computer subsystem with the correct vital product data of said third computer processor subsystem.

2. The method of claim 1, wherein:

if a difference in said vital product data is communication addressing information of said third computer processor subsystem, said one computer processor subsystem sends said request to said third computer processor subsystem using said one computer processor subsystem's communication address for said third computer processor subsystem; and if said request fails, said one computer processor subsystem sends said request to said third computer processor subsystem using said at least one other computer processor subsystem's communication address for said third computer processor subsystem.

3. A system, comprising:

a plurality of computer processor subsystems, said computer processor subsystems comprising associated:

memory configured to store vital product data of one computer processor subsystem associated with said memory, and to store at least some vital product data of other said computer processor subsystems of said system;

at least one node configured to communicate with other said computer processor subsystems of said system; and at least one computer processor configured to operate said one computer processor subsystem to, in response to receiving an update to vital product data of said system from a source computer processor subsystem of said system, examining said update to detect vital product data about said one computer processor subsystem stored by said source computer processor subsystem;

said one computer processor subsystem is the authoritative reference for its own vital product data and, in response to said detected vital product data having incorrect vital product data about said one computer processor subsystem, said one computer processor subsystem forwarding pre-existing correct vital product data of said one computer processor subs stem to said source computer processor subsystem having said incorrect vital product data; and wherein said at least one computer processor is configured to operate said one computer processor subsystem, in response to receiving vital product data of another computer processor subsystem of said system, if the sending computer processor subsystem is the authoritative reference for said received vital product data, to update the vital product data for said another computer processor subsystem as stored by said receiving one computer processor subsystem with said received vital product data; and to determine whether vital product data about a third computer processor subsystem stored by at least one other computer processor subsystem is different from said vital product data about said third computer processor subsystem stored by said one computer processor subsystem; and said third computer processor subsystem is the authoritative reference for its own vital product data, and if said vital product data about said third computer processor subsystem stored by said at least one other computer processor subsystem is different, said one computer processor subsystem requests said third computer processor associated one computer processor subsystem with the correct vital product data of said third computer processor subsystem.

4. The system of claim 3, wherein:

if a difference in said vital product data is communication addressing information of said third computer processor subsystem, said one computer processor subsystem sends said request to said third computer processor subsystem using said one computer processor subsystem's communication address for said third computer processor subsystem; and if said request fails, said one computer processor subsystem sends said request to said third computer processor subsystem using said at least one other computer processor subsystem's communication address for said third computer processor subsystem.

5. A computer program product tangibly embodied in a non-transient computer useable medium comprising computer readable program code for synchronizing vital product data in one computer processor subsystem with respect to a system of computer processor subsystems, said computer processor subsystems storing at least some vital product data of the other computer processor subs stems of said system, said computer readable code configured to cause:

said one computer processor subsystem, in response to receiving an update to vital product data of said system from a source computer processor subsystem of said system, to examine said update to detect vital product data about said one computer processor subsystem stored by said source computer processor subsystem; and said one computer processor subsystem is the authoritative reference for its own vital product data and in response to said detected vital product data having incorrect vital product data about said one computer processor subsystem, said one computer processor subsystem to forward pre-existing correct vital product data of said one computer processor subsystem to said source computer processor subsystem having said incorrect vital product data;

wherein said computer readable code is configured to cause said one computer processor subsystem, in response to receiving vital product data of another computer processor subsystem of said system, if the sending computer processor subsystem is the authoritative reference for said received vital product data, to update the vital product data for said another computer processor subsystem as stored by said one computer processor subsystem with said received vital product data; and additionally comprising computer readable code configured to cause:

said one computer processor subsystem to determine whether vital product data about a third computer processor subsystem stored by at least one other computer processor subsystem is different from said vital product data about said third computer processor subsystem stored by said one computer processor subsystem; and said third computer processor subsystem is the authoritative reference for its own vital product data, and if said vital product data about said third computer processor subsystem stored by said at least one other computer processor subsystem is different, said one computer processor subsystem to request said third computer processor subsystem to update said one computer subsystem and said at least one other computer subsystem with the correct vital product data of said third computer processor subsystem.

6. The computer program product of claim 5, wherein said computer readable code is configured to cause:

if a difference in said vital product data is communication processing information of said third computer processor subsystem, said one computer processor subsystem to send said request to said third computer processor subsystem using said one computer processor subsystem's communication address for said third computer processor subsystem; and if said request fails, said one computer processor subsystem to send said request to said third computer processor subsystem using said at least one other computer subsystem's communication address for said third computer processor subsystem.

7. A computer processor subsystem configured to synchronize vital product data with respect to a system of computer processor subsystems, said computer processor subsystems storing at least some vital product data of the other computer processor subsystems of said system, said computer processor subsystem comprising associated:

memory configured to store vital product data of one computer processor subsystem associated with said memory, and to store at least some vital product data of other said computer processor subsystems of said system;

at least one node configured to communicate with other said computer processor subsystems of said system; and at least one computer processor configured to operate said one computer processor subsystem, in response to receiving an update to vital product data of said system from a source computer processor subsystem of said system, to examine said update to detect vital product data about said one computer processor subsystem stored by said source computer processor subsystem;

said one computer processor subsystem is the authoritative reference for its own vital product data and, in response to said detected vital product data having incorrect vital product data about said one computer processor subsystem, said one computer processor subsystem to forward pre-existing correct vital product data of said one computer processor subsystem to said source computer processor subsystem having said incorrect vital product data;

wherein said at least one computer processor is configured to operate said computer processor subs stem in response to receiving vital product data of another computer processor subsystem of said system, if the sending computer processor subsystem is the authoritative reference for said received vital product data, to update the vital product data for said another computer processor subsystem as stored by said one computer processor subs stem with said received vital product data; and wherein said at least one computer processor is configured to operate said one computer processor subsystem:

additionally to determine whether vital product data about a third computer processor subsystem stored by at least one other computer processor subsystem is different from said vital product data about said third computer processor subsystem stored by said one computer processor subsystem; and said third computer processor subsystem is the authoritative reference for its own vital product data, and if said vital product data about said third computer processor subsystem stored by said at least one other computer processor subsystem is different, to request said third computer processor subsystem to update said at least one other computer processor subsystem and said one computer processor subsystem with the correct vital product data of said third computer processor subsystem.

8. The computer processor subsystem of claim 7, wherein said at least one computer processor is configured to operate said one computer processor subsystem:

if a difference in said vital product data is communication addressing information of said third computer processor subsystem, to send said request to said third computer processor subsystem using said one computer processor subsystem's communication address for said third computer processor subsystem; and if said request fails, to send said request to said third computer processor subsystem using said at least one other computer processor subsystem's communication address for said third computer processor subsystem.

* * * * *